United States Patent [19]

Lewallyn

[11] 4,234,282
[45] Nov. 18, 1980

[54] CARPET SAMPLE STACKER

[76] Inventor: Michael A. Lewallyn, P.O. Box 1361, Dalton, Ga. 30720

[21] Appl. No.: 968,267

[22] Filed: Dec. 11, 1978

[51] Int. Cl.³ ............................................. B65G 57/03
[52] U.S. Cl. ...................................... 414/45; 271/189; 414/69; 414/100; 414/786; 414/900
[58] Field of Search ....................... 414/45, 69, 76, 86, 414/91, 100, 786, 900; 271/177, 180, 189

[56] References Cited

U.S. PATENT DOCUMENTS

| | | | |
|---|---|---|---|
| 973,428 | 10/1910 | Henderson | 271/189 |
| 1,234,122 | 7/1917 | Berold | 271/189 |
| 2,606,483 | 8/1952 | Forbes | 414/45 X |
| 3,312,357 | 4/1967 | Stephens et al. | 414/45 X |
| 3,374,902 | 3/1968 | Mills | 414/45 X |
| 3,593,860 | 7/1971 | Brenner | 271/189 X |
| 3,688,920 | 9/1972 | Frish | 414/45 |
| 3,892,168 | 1/1974 | Grobman | 414/91 X |

Primary Examiner—L. J. Paperner
Attorney, Agent, or Firm—Jones, Thomas & Askew

[57] ABSTRACT

An apparatus for placing carpet samples one on top of the other in a neat, uniform stack to minimize the need for human involvement in the stacking process and to minimize the time required in stacking operations by quickly and automatically bringing samples individually into the apparatus along a conveyor belt, sliding the samples out over adjustable bars, dropping the samples from the bars one on top of the other to form a stack on a movable platform, lowering the stack by lowering the platform in response to the size of the stack and then removing the stack by a conveyor to a point where it can be easily picked up.

7 Claims, 4 Drawing Figures

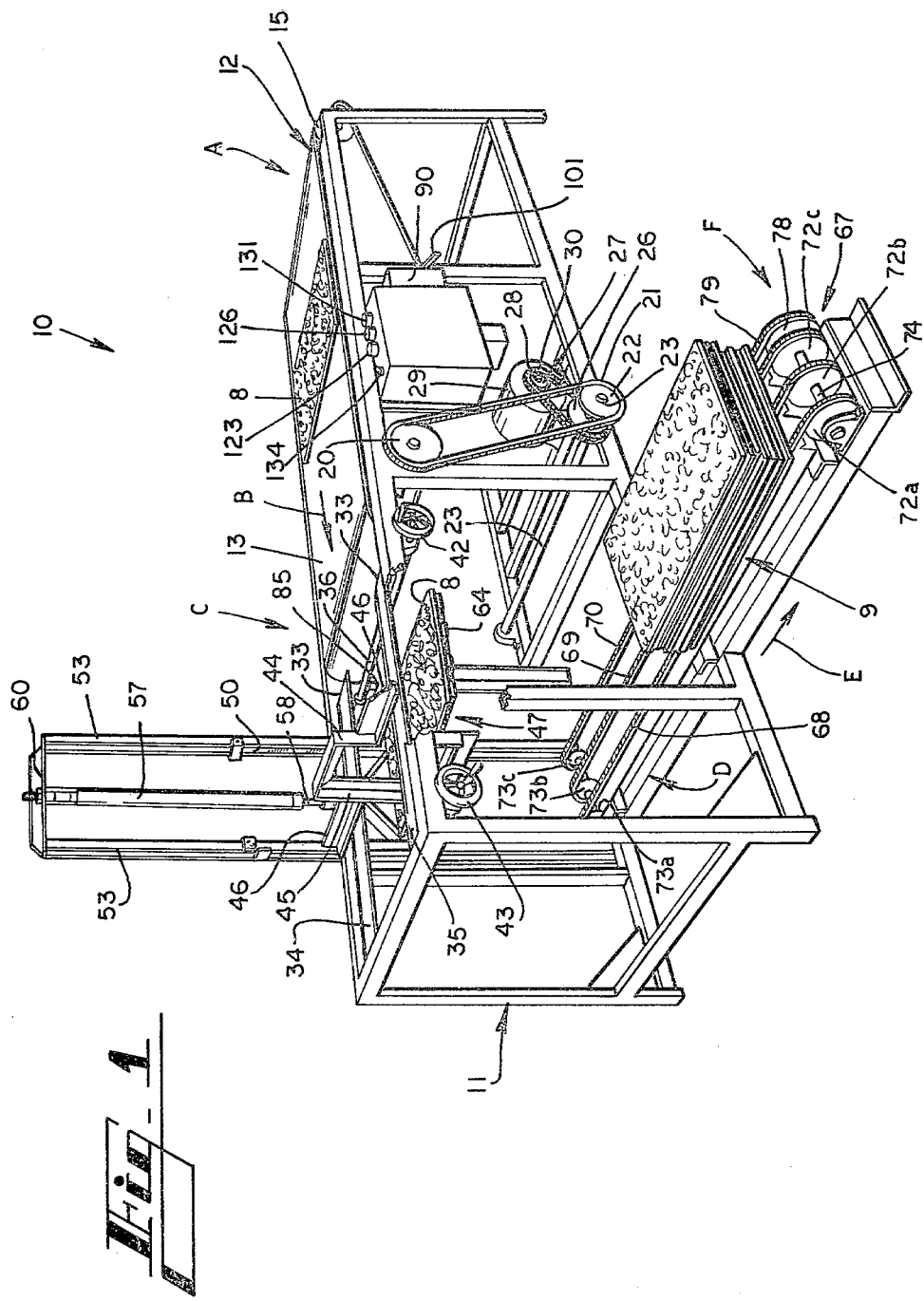

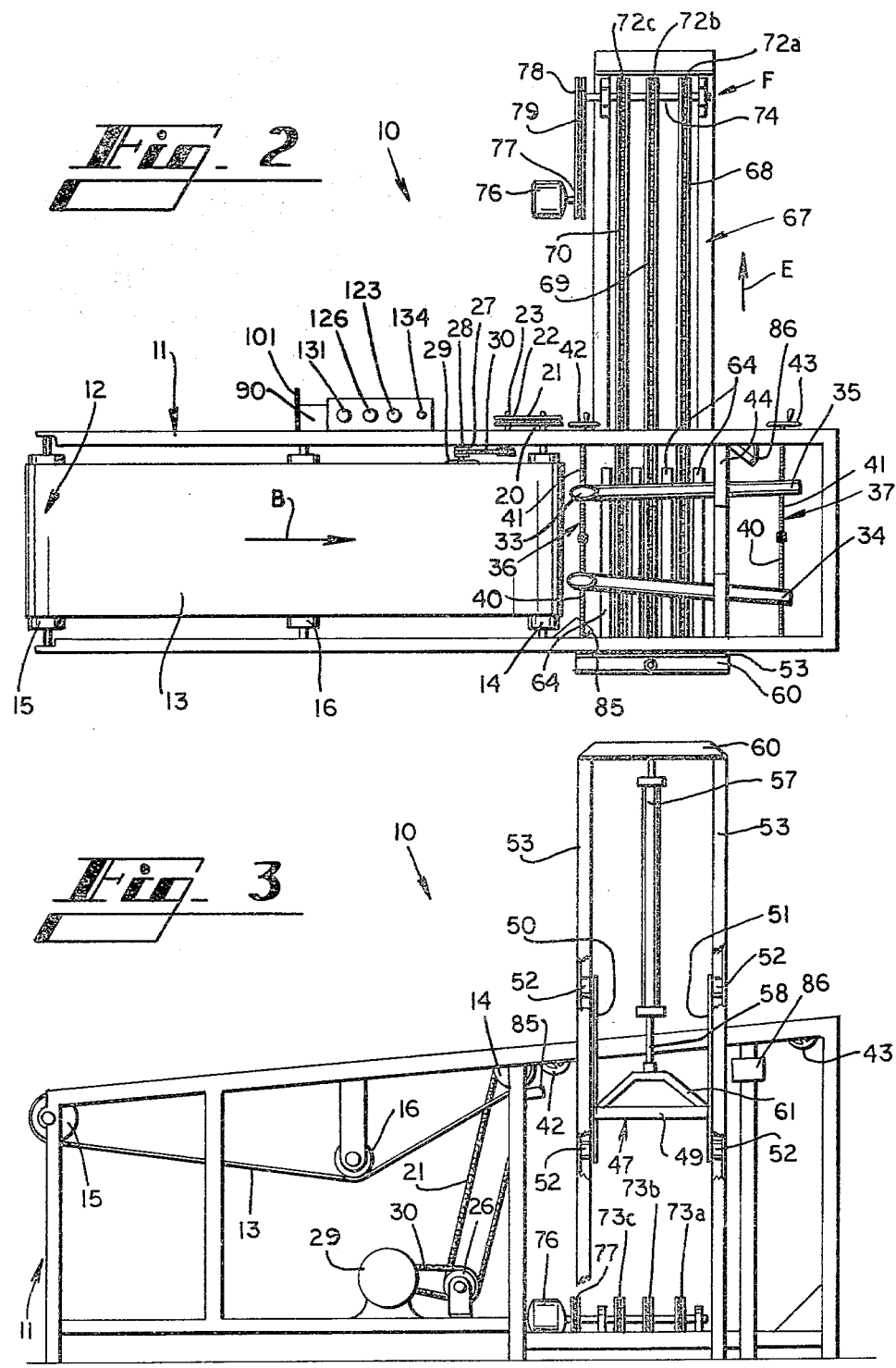

4,234,282

CARPET SAMPLE STACKER

DESCRIPTION

Field of Invention

The disclosed invention relates to an apparatus and associated method for automatically forming carpet samples into a vertical stack and after the stack reaches a preferred height, moving the stack to make room for another stack.

Background of the Invention

Carpet samples are used extensively by carpet sales people, by contractors and homeowners as samples of the larger carpet which they may eventually use in homes or offices. Samples are made in large quantities by cutting scrap pieces of carpet from the original larger roll and then cutting the scrap pieces into small generally rectangular pieces of uniform size called swatches or samples. After the cutting process, the samples are placed into stacks by hand labor for shipping or for storage. The cutting and hand stacking of the samples requires the presence and attention of workers, usually on an irregular time schedule, and the samples usually are cut and delivered from the cutting apparatus in multiple numbers in a short time span, then with a delay before the next samples are cut and delivered, sometimes causing the worker to be idle when waiting for the next cutting and delivery cycle.

SUMMARY OF THE INVENTION

Briefly described, the present invention comprises a method and apparatus for accurately and automatically arranging a plurality of rectangular flexible items such as carpet samples in vertical stacks, which is able to receive the carpet samples continuously or at an irregular delivery rate and form the carpet samples in neatly arranged vertical stacks of predetermined height, without requiring the presence of a worker. The apparatus comprises a first conveyor which moves carpet samples one at a time along an approximately horizontal path. At the end of the first conveyor, the samples are automatically removed from the conveyor and dropped and guided vertically, one on top of the other, to form a stack supported by a movable platform above the floor surface. The platform gradually lowers the stack of samples in measured increments in response to the increasing height of the stack supported by the platform. An electric eye senses the increasing height of the stack on the platform and triggers lowering of the platform a predetermined increment each time the stack has increased in height by a predetermined amount. A second conveyor removes the stack from the platform as the platform approaches the floor surface and the stack comes to rest on the second conveyor. The second conveyor moves the stack along a second approximately horizontal path out of the apparatus. The apparatus can be fully automatic and does not require the presence of a worker.

It is therefore an object of the present invention to provide an apparatus for receiving carpet samples at an irregular delivery rate and for automatically and reliably forming the separate carpet samples into a stack without requiring the presence of a worker.

Other objects, features and advantages of the present invention will become apparent from a review of the following specification, when taken in conjunction with the accompanying drawings.

BRIEF DESCRIPTION OF THE DRAWINGS

FIG. 1 is a perspective view of the carpet sample stacker with parts broken away.

FIG. 2 is a top view of the carpet sample stacker.

FIG. 3 is a side elevational view, with parts broken away, of the carpet sample stacker.

DETAILED DESCRIPTION

Figure 4:
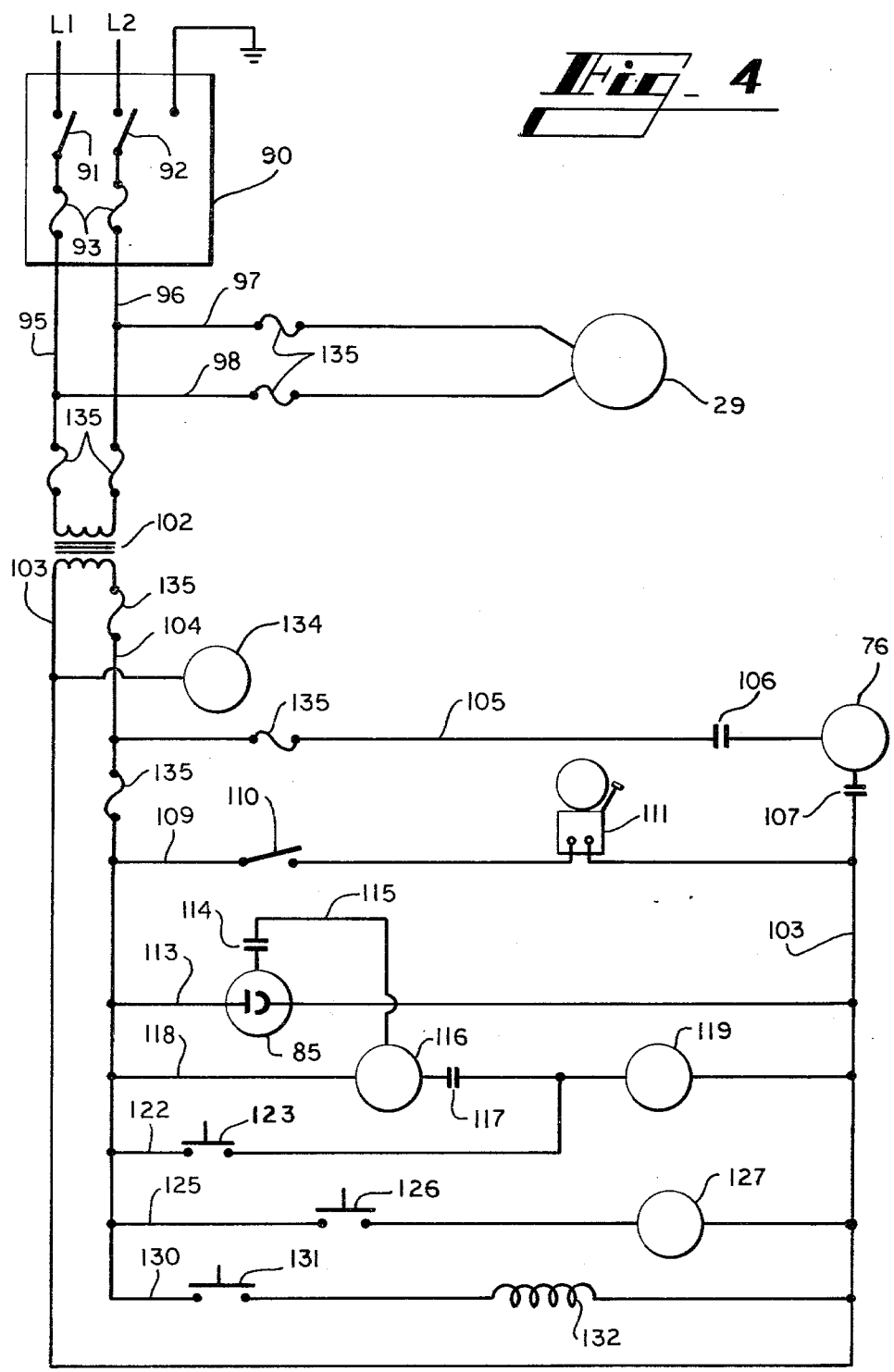
FIG. 4 is an electrical schematic diagram of the control system of the carpet sample stacker.

Referring now in greater detail to the drawings in which like numerals represent like components throughout the several views, FIG. 1 shows the stacking apparatus 10 of the present invention which automatically places a plurality of separately incoming carpet samples 8, or like sheets of material, into outgoing stacks 9. The apparatus comprises a rectangular framework 11 which normally rests on a workshop floor. The framework 11 supports a first conveyor 12 which comprises a conveyor belt 13 formed in a continuous loop and extended about a drive roll 14 and two idler rolls 15, 16 (FIG. 2). The drive roll 14 includes a driven sprocket 20 mounted to one end of the drive roll. The driven sprocket 20 is connected by drive chain 21 to a drive sprocket 22 mounted on rotatable shaft 23. The drive sprocket 22 is connected in rotating relationship to a driven pulley 26 which is coupled to a drive pulley 27 mounted on the drive shaft 28 of the first conveyor motor 29 by a chain 30 surrounding the two pulleys 26, 27.

A pair of elongated tubular shaped beam members 34, 35 are supported by the framework 11 adjacent the drive roll 14 and extend lengthwise away from the first conveyor 12 and approximately parallel to the direction of movement (arrow B) of an incoming carpet sample 8 on the conveyor belt 13. Each beam member 34, 35 comprises a wedge shaped tip 33 at the end of the beam member adjacent the drive roll 14. The beam members 34, 35 are each mounted at their front portions to a first common, threaded travel rod 36 and at their rear portions to a second common threaded travel rod 37. The threaded travel rods 36, 37 are divided at their centers into two oppositely threaded portions 40, 41 with one beam member 34 mounted to one threaded portion 40 of each threaded travel rod 36, 37 and the other beam member 35 mounted to the other threaded portion 41 of each threaded travel rods 36, 37. A crank handle 42, 43 is attached to one end of each threaded rods 36, 37. When one of the crank handles is turned, its travel rod rotates and moves one end of each beam 34 and 35 closer together or farther apart.

A carpet sample stop 44 in the form of an upright rectangular frame 45 with outwardly extending support arms 46 resting on the framework 11 is positioned at a distance along the beam members 34, 35 and is oriented perpendicular to the direction of movement (arrow B) of the carpet samples.

A platform assembly 47 is positioned below the beam members 34, 35 at the carpet exiting end of the first conveyor 12 adjacent the drive roll 14. The platform assembly includes a platform support member 49 (FIG. 3) which extends horizontally between two vertical travel plates 50, 51, each of which travels on two wheels 52 within a vertical track 53. A pneumatic cylinder 57 with extendable cylinder rod 58 is attached to a cross brace 60 extending between the top portions of the vertical tracks 53, and the cylinder rod 58 is attached to the support member 49 through an angle brace 61. Attached to and protruding horizontally from the platform support member 49 are four spaced apart elongated parallel fingers or appendages 64. These fingers 64 define a platform resembling a fork.

A second conveyor 67 is located on the ground surface with one end of the conveyor 67 being located directly beneath the platform fingers 64. The second conveyor 67 comprises three parallel, spaced apart chains 68, 69, 70, each chain formed in a continuous loop encircling drive sprockets 72a, 72b, 72c and idler sprockets 73a, 73b, 73c and the chains extend perpendicular to the direction of movement (arrow B) of samples along the first conveyor 12. The three drive sprockets 72 are mounted on a common rotatable drive shaft 74 (FIG. 1) coupled to a second conveyor motor 76 by a pair of pulleys 77, 78 and a chain 79 encircling the pulleys. The chains 68, 69, 70 are in aligned relationship with the platform fingers 64, such that the fingers are in vertical alignment with the spaces between or beside the chains.

An electric eye combination light source and light sensor 85 is located on one side of the framework 11, below and adjacent the drive roll 14. A reflective surface or mirror 86 is supported by the framework 11 diagonally opposite from the light source 85, across the platform fingers 64.

The electrical control circuitry for the stacking apparatus of the present invention is shown schematically in FIG. 4, parts of which are also shown pictorially in FIGS. 1-3. FIG. 4 depicts the electrical circuitry which comprises a disconnect box 90, including disconnect switches 91, 92 and fuses 93 through which 230 volt, single phase alternating current is supplied through conductors 95, 96, and 97, 98 to the first conveyor motor 29. Conductors 95, 96 also connect to a step-down transformer 102. The transformer 102 steps down the voltage from 230 volts, required by the first conveyor motor 29, to 110 volts, supplied to the remaining system components through conductors 103 and 104. The remaining system components, the operation of which is explained below, include relay contacts 106, 107 and conveyor motor 76; normally open limit switch 110 and bell 111; electric eye 85, normally open contact 114, timer delay 116, normally open contact 117 and "air-down" solenoid valve 119; first pushbutton contact 123, second pushbutton contact 126, "air up" solenoid valve 127, third pushbutton contact 131 and relay coil 132. A plurality of fuses 135 are also shown on the schematic of FIG. 4.

OPERATION

In operation, the stacking apparatus of the present invention accepts individual incoming carpet samples 8 at entrance "A"; moves the samples in the direction of arrow "B"; forms the samples, one on top of the other, into a stack 9 at stacking zone "C"; lowers the stack to position "D"; and delivers the stack 9 in the direction of arrow "E" to a removal point "F". The samples 8 can be placed on the apparatus by hand or by other machines coupled to the present apparatus within a production system. Removal of the stack 9 can be accomplished in the same way.

The carpet samples 8 are moved by the conveyor belt 13, which is driven by the first conveyor motor 29, along the direction of the arrow "B". The motor 29 is switched on and runs continuously upon closing of switches 91, 92 in the disconnect box 90. As the carpet sample 8 approaches the end of the conveyor belt 13 adjacent the stacking zone "C", the sample engages the tips 33 of the stationary beam members 34, 35 and is "picked" off or removed from the conveyor belt 13 by the wedge shaped tips 33 of the beam members. The movement of the belt 13 forces the sample 8 out along the stationary beam members 34, 35 until the sample contacts the carpet stop 44. The flexible sample being only temporarily suspended by the two beam members 34, 35, drops down between the beams to land on the platform formed by the fingers 64 (hereafter also referred to as platform 64). Therefore, the two beam members 34, 35 function as a sample suspending means. The two beam members 34, 35 can be adjusted so as to be moved closer together or further apart as desired to accommodate various sizes of samples 8, by turning the two crank handles 42, 43 to rotate the threaded bars 36, 37. Since the beam member 34, 35 are mounted on oppositely threaded portions 40, 41 of the same rods 36, 37, rotation of the rods moves the beam members in opposite directions. The fronts and backs of the beam members 34, 35 can be independently adjusted since each threaded bar 36, 37 has its own handle 42, 43. Thus, the alignment of the two beam members can be varied from parallel alignment to a limited range of "toe-in" and "toe-out" alignments, which, for purposes of this specification shall be deemed "approximately" parallel. Subsequent samples 8 are similarly moved along by the conveyor belt 13 and dropped in place on top of the previous samples on the platform fingers 64 to form a stack 9.

Before the first sample 8 is stacked on the platform fingers 64, the platform 64 is at its uppermost position; that is, the cylinder rod 58 of the pneumatic cylinder 57 is in its fully retracted position and the platform is drawn vertically upward along the tracks 53 to a position only a short distance below the beam members 34, 35. As a stack 9 of carpet samples is formed on the platform and increases in height, the platform 64 is moved gradually downward to make room for additional samples to drop onto the top of the stack. By so moving the platform from an uppermost or "top" position gradually downward in response to the height of the stack, the distance which a sample 8 must drop from the beam members 34, 35 to the stack 9 is maintained at a desired minimum to insure a uniform, balanced stack 9.

The electric eye 85 casts a continuous light beam across and above the platform 64 at a predetermined distance below the beam members 34, 35. When the platform 64 is at its top position, the electric eye light beam passes a distance above the platform approximately equal to the height of a stack 9 of three or four carpet samples 8. When the light beam is unbroken, a closed circuit is made between conductors 104 and 103 through conductor 113 and electric eye 85. Once the initial three or four samples are stacked on the platform, the stack 9 is high enough to block the beam of the electric eye 85 and prevent its reflection by the reflective surface 86 back to the electric eye sensor at the electric eye. Blockage of the light beam closes normally open contact 114 (see FIG. 4) such that current flows from conductors 104 and 113 through conductor 115 to energize the timer delay 116 thus closing normally open contact 117. The circuit is completed through conductor 118 and air-down solenoid valve 119 to common conductor 103 thus activating the air-down solenoid valve 119 which extends the cylinder rod 58 of the pneumatic cylinder 57 to lower the platform 64. As the platform 64 is lowered, the stack 9 is moved downward and blockage of the electric eye light beam is ended. The light beam is again reflected by the reflective surface 86 back to the light sensor of the electric eye 85 thus reopening contact 114 and contact 117. Reopening of contacts 114 and 117 remakes the circuit from conductor 104 through conductor 113 to common 103 and results in deactivating the air-down solenoid valve 119, and stopping downward movement of the platform 64. As more samples 8 are dropped onto the stack 9, the light beam is again blocked, the platform 64 moves down, and the beam is unblocked. In this way, the platform 64 moves in increments, gradually downward to its bottom position "D".

The timer delay 116 prevents simultaneous opening and closing of the two contacts 114 and 117 to delay activation and to delay deactivation of the air-down solenoid valve 119. This delay, although not a necessary component of the invention, is an advantage in providing a practical embodiment of the invention. The timer delay 116 insures that the contact 114 is closed for a predetermined period of time before contact 117 will be energized and closed. Therefore, the contact 117 is not closed and the air-down solenoid valve 119 is not activated each time a carpet sample 8 drops past the electric eye 85 on its way to the stack 9 and temporarily interferes with or blocks the light beam. This attempts to insure that the platform 64 will only move downward in response to the stack 9 reaching a height sufficient to block the light beam for a prolonged period of time.

Furthermore, the timer delay 116 provides that the contact 114 will reopen for a predetermined period of time before contact 117 will be deenergized and reopened. Therefore, the contact 117 is not reopened and the air-down solenoid valve 119 is not deactivated immediately upon remaking or unblocking of the electric eye light beam. In this way, downward movement of the platform 64 is not stopped as soon as the top of the stack 9 moves away from light beam; but rather, the platform continues to move downward for a short period of time, as determined by timer delay 116, after the light beam is again unblocked. In this way, sufficient room is provided for at least two or three more samples 8 to be stacked on top of the stack 9 before the light beam is again blocked to trigger downward movement of the platform 64.

A pushbutton contact 123 is provided to bypass the electric eye 85 and timer delay 116 by making a completed circuit, when closed, from conductor 104 through conductor 122, first pushbutton contact 123, conductor 118 and air down solenoid valve 119 to common 103. The pushbutton 123 allows an operator to selectively operate the air down solenoid valve 110 and lower the platform 64 the entire distance to its bottom position "D" either all at once or in increments at his discretion.

As the platform 64 approaches its bottommost or "down" position, D, each finger 64 of the platform passes on one side or the other of one of the chains 68, 69, 70 to decend below the top surfaces of the chains. The stack 9 is left supported by the top surfaces of the chains 68, 69, 70 as the platform fingers 64 break contact with the stack 9. Once the platform fingers 64 have broken contact with the stack 9 and the platform 64 has reached its bottom position "D", the platform contacts and closes limit switch 110, thus making a circuit from conductor 104 through conductor 109, closed switch 110, and bell 111 to common 103 and activating the bell 111. This bell 111 notifies the operator of the machine that he should depress pushbutton 131 to complete a circuit from conductor 104 through conductor 130, pushbutton contact 131 and relay coil 132 to common 103. Completion of this circuit activates relay coil 132 and thus closes contacts 106 and 107 to make the circuit from conductor 104 through conductor 105, contact 106, second drive motor 76 and contact 107 to common 103. The making of this circuit activates second drive motor 76. Second drive motor 76 turns the chains 68, 69, 70 of the second conveyor 67 to move the outgoing stack 9 along the direction indicated by arrow "E" to the removal point "F" at the end of the second conveyor. In the alternative, the circuit made to bell 111 can also energize the coil of a relay (not shown) in which case the contacts of the relay close the circuit to the second conveyor motor 76 and thus operate the second conveyor 67 automatically upon the platform 64 reaching its bottom position and triggering the limit switch 111. This would eliminate the need for human intervention at this point of the operation.

Once the stack has been moved to removal point "F", or at least once the stack has cleared the platform 64, the operator depresses pushbutton 126 to make a circuit from conductor 104 through conductor 125, pushbutton contact 123 and air up solenoid 127 to common 103. The making of this circuit activates the air-up solenoid 127 and returns the pneumatic cylinder rod 58 and the platform 64 back to the "top" position. In the alternative, another limit switch can be positioned along the path of the second conveyor 67 which is triggered by the stack 9 at its passes by the switch. This limit switch would close the circuit to the air-up solenoid 127 to automatically return the platform 64 to its top position. The same limit switch turns off the second conveyor motor 76 once the stack 9 has reached the end of the conveyor 67 and simultaneously activates the air-up solenoid 127. It can be seen that the apparatus of the present invention can be made totally automatic.

While this invention has been described in specific detail with particular reference to a preferred embodiment thereof, it will be understood that variations and modifications can be effected within the spirit and scope of the invention as described hereinbefore and as defined in the appended claims.

I claim:

1. An apparatus for automatically stacking carpet samples and like sheets of material, comprising:
    a first surface conveyor means for moving the sheets of material along a first horizontal path from a first end to a second end of said first surface conveyor means;
    a second surface conveyor means positioned at the second end of said first surface conveyor means and below said first surface conveyor means and extending at a right angle with respect to the first horizontal path of said first surface conveyor means for moving the sheets of material along a second horizontal path;
    a platform means for moving the sheets of material vertically from the second end of said first surface conveyor means to said second surface conveyor means, said platform means being movable between a top position adjacent the second end of said first surface conveyor means and a bottom position adjacent said second surface conveyor means;

a pair of spaced apart horizontally oriented sheet suspending means positioned at the end of the first horizontal path and extending from and beyond the second end of said first surface conveyor means and defining a space therebetween vertically above said platform means;

a stop member positioned in the space between said sheet suspending means and spaced from the second end of said first surface conveyor means whereby sheets are pushed by the first surface conveyor means out onto the spaced sheet suspending means until the sheet is stopped by the stop member and falls through the space between said suspending means and accumulate in a stack on said platform means;

material sensing means for sensing the presence of sheets of material stacked at a predetermined minimum height above said top position of said platform means on said platform means and for emitting a signal in response to said sensing; and platform moving means for intermittantly lowering said platform means in response to said signal from said sensing means.

2. Apparatus of claim 1 and wherein said sheet suspending means comprises: two elongated beam members positioned adjacent the second end of said first conveyor means and extending approximately parallel to the direction of movement of the sheets along the first path, and means for adjusting the space between said beam members.

3. Apparatus of claim 1 and wherein:

said first conveyor means comprises a movable conveyor belt suspended by framework above a ground surface;

said second conveyor means comprises a plurality of parallel, movable, spaced apart chains for supporting said sheets; and said platform means comprises a plurality of spaced apart elongated appendages extending apporoximately parallel to one another and to said chains in a horizontal orientation, each said appendage being attached at one of its ends to a common support and being movable vertically up and down in unison with said common support from said top position to said bottom position at which said appendages are located below said chains of said second conveyor means.

4. Apparatus of claim 1 and wherein said sensing means comprises:

a light source; and a photoelectric cell for detecting said light source.

5. Apparatus of claim 1 and wherein said platform moving means comprises a pneumatically operated cylinder positioned at a level above said first conveyor means with a cylinder rod extending downwardly therefrom with its distal end attached to said platform means.

6. A method of automatically stacking carpet samples and like rectangular swatches of flexible sheet materials, comprising the steps of:

pushing a plurality of swatches successively along a first horizontal path onto a pair of spaced apart horizontally oriented suspending means;

temporarily supporting the swatches on the suspending means as the swatches move onto the suspending means;

stopping movement of each swatch along the first path at a predetermined position on said suspending means;

dropping each swatch between the suspending means to a platform below the the suspending means to form part of a stack of swatches supported by the platform;

sensing the presence of the upper portion of the stack of swatches at a predetermined distance below the suspending means;

lowering the platform vertically a predetermined distance in response to the presence of the upper portion of the stack of swatches at the predetermined distance below the suspending means;

sensing the arrival of the platform at a predetermined bottom position; and moving the stack of swatches off the platform and along a second horizontal path normal to the first horizontal path in response to the platform arriving at the bottom position.

7. A method of automatically stacking flexible rectangular carpet swatches and like sheet materials, comprising the steps of:

moving a plurality of rectangular swatches one at a time individually in a horizontal attitude along a first horizontal surface conveyor;

pushing each sample at the end of the first horizontal conveyor out over spaced apart diverging horizontal bars which are spaced apart a distance corresponding to the width and stiffness of the swatches;

stopping the movement of each of the samples as each sample has moved out to a predetermined position on the horizontal bars;

after each sample has stopped, dropping each sample between the bars one on top of the other onto a vertically movable platform to form a stack on the movable platform;

intermittantly lowering the stack by lowering the platform in response to an increase in the height of the stack on the platform;

after the stack accumulated on the platform reaches a desired height lowering the platform beneath the upper flight of a second horizontal surface conveyor and supporting the stack on the upper flight of the second horizontal surface conveyor, and conveying the stack by the second surface horizontal conveyor out from beneath the diverging horizontal bars in a direction normal to the first horizontal surface conveyor to a pick-up point.

* * * * *